June 15, 1926.

A. J. HERSEY 1,588,578

VEHICLE SUSPENSION

Filed March 7, 1925

Inventor
ARTHUR J. HERSEY.
By Geo. Stevens.
Attorney

Patented June 15, 1926.

1,588,578

UNITED STATES PATENT OFFICE.

ARTHUR J. HERSEY, OF MINNEAPOLIS, MINNESOTA.

VEHICLE SUSPENSION.

Application filed March 7, 1925. Serial No. 13,674.

This invention relates to spring suspension for vehicles and has special reference to a novel form of spring suspension adapted for use upon automobiles, either as regular equipment or substitutions for other forms of suspension now in use.

The principal object is that of efficiency, together with the maximum of ease and comfort in respect to the load carried.

Another object is that of simplicity of adaptability, and other objects and advantages of the peculiar construction will appear in the further description thereof.

Referring now to the accompanying drawing, forming part of this application, and in which like reference characters indicate like parts:

Figure 1:
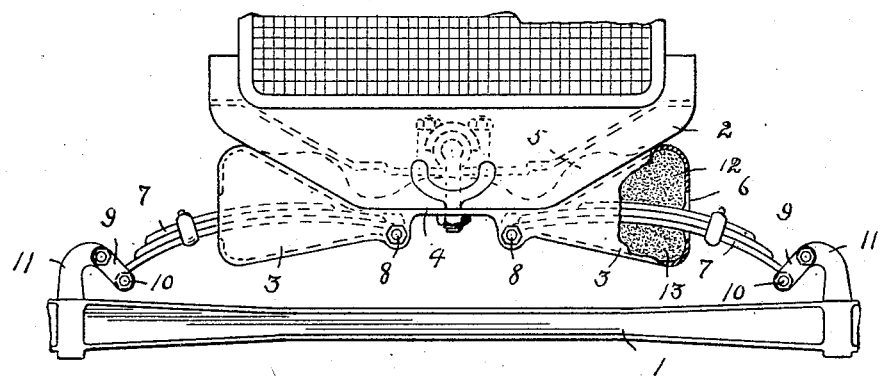
Figure 1 is a front elevation, partly broken away, of a Ford type of car, with one of the improved cushion shackle springs applied thereto.

1 represents an elevation of the axle of a Ford car, and 2 the channel skirt on the front end of the chassis frame in which the ordinary transverse spring is housed.

In my improved spring suspension I form a butterfly housing comprising the opposed hollow wings 3 united by an upwardly arched solid portion 4, above which is formed a camel back channel, the sides of which are indicated at 5, they being stepped inwardly from the sides of the wings 3 so that the skirt fits down snugly over the channel and substantially flush with the sides of the wings. The wings 3 are substantially triangular in form, high, and narrow in the outer extremities, and have in their outer faces vertically elongated rectangular openings 6, through which the leaf springs 7 protrudes; the opening being substantially the same width as the springs so that the latter have free play therein.

The innermost ends of the springs are pivotally attached by bolts 8 extending through the housing at the apex of each wing, while the opposite ends of the springs are suspended within the ordinary perch shackles 9, as at 10, the perches being shown at 11.

Above each spring and in the hollow wing is installed preferably a single piece of rubber 12, previously shaped for such installation and of the proper consistency in respect to the load to be carried. Beneath the spring within each hollow wing is also a similarly shaped piece of rubber 13 so that the central portion of the spring virtually floats on rubber. In this manner we have two springs, each supporting its portion of the load centrally, and that in a resilient manner so that one compensates or assists, in its action, the other, when abnormal stress is applied thereto.

Figure 2:
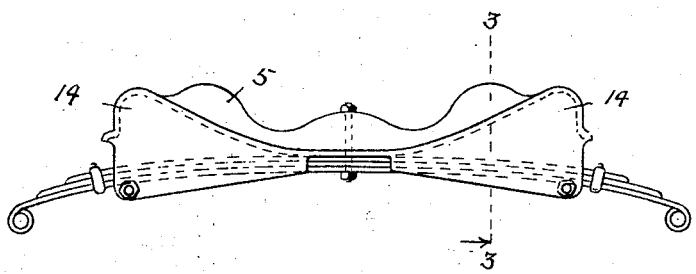
Figure 2 is a front elevation of a modified form of cushion spring suspension.
Figure 3:
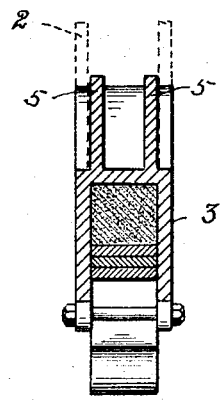
Figure 3 is an enlarged section on the line 3—3 Figure 2.

In Figure 2 I have shown a somewhat modified form in that but a single spring is employed, the opposite ends extending outwardly beyond the butterfly housing 14 and in which housing rubber is used above the spring only, there being through bolts in the lower outer corners of each wing beneath the spring to retain the latter within the housing.

The modification shown in Figure 2 is particularly designed for heavier service than that shown in Figure 1, and has the advantage thereover of being somewhat more simple in construction, though less flexible, in that the weight of the vehicle is partially supported directly upon the spring, and the cushioning effect dependent upon the compression with which the rubber above the spring is installed; whereas in that embodiment shown in Figure 1 the entire weight of the vehicle rests upon the rubber cushion due to the pivotal connection of the inner ends of the supporting springs.

Having thus described the invention in a manner to enable those skilled in the art to make and use the same, what I claim, is:

1. The combination with a vehicle having a chassis frame spaced from the axle of the vehicle, of a metal spring member pivotally connected to the axle and pivotally connected at the opposite end to the chassis frame, and rubber cushioning means intermediate of the centermost portion of the spring and the chassis frame.

2. A vehicle spring assemblage of the class described comprising a double elongated housing for cooperative engagement with the chassis frame of the vehicle, a spring member within either portion of the housing and pivotally attached therewithin at one end and pivotally supported at their opposite ends, and rubber cushioning means within the housing both above and below the spring members.

In testimony whereof I hereunto affix my signature.

ARTHUR J. HERSEY.